(12) United States Patent
Hyun

(10) Patent No.: US 12,086,068 B2
(45) Date of Patent: Sep. 10, 2024

(54) MEMORY SYSTEM AND HOST DEVICE

(71) Applicant: SK hynix Inc., Gyeonggi-do (KR)

(72) Inventor: Sung Woo Hyun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 18/190,135

(22) Filed: Mar. 27, 2023

(65) Prior Publication Data

US 2024/0126699 A1   Apr. 18, 2024

(30) Foreign Application Priority Data

Oct. 12, 2022  (KR) ........................ 10-2022-0130134

(51) Int. Cl.
| | |
|---|---|
| G06F 12/0862 | (2016.01) |
| G06F 12/0804 | (2016.01) |
| G06F 13/42 | (2006.01) |

(52) U.S. Cl.
CPC ...... *G06F 12/0862* (2013.01); *G06F 12/0804* (2013.01); *G06F 13/4221* (2013.01)

(58) Field of Classification Search
CPC ............. G06F 12/0862; G06F 12/0804; G06F 13/4221
See application file for complete search history.

(56) References Cited

U.S. PATENT DOCUMENTS

| | | | | |
|---|---|---|---|---|
| 2022/0050781 | A1* | 2/2022 | Acharya | ................ G06F 12/10 |
| 2022/0058132 | A1* | 2/2022 | Roberts | ............... G06F 12/0862 |
| 2023/0385199 | A1* | 11/2023 | Cathrine | ............. G06F 12/0897 |

FOREIGN PATENT DOCUMENTS

| | | |
|---|---|---|
| KR | 10-2015-0133524 A | 11/2015 |
| KR | 10-2018-0124709 A | 11/2018 |

* cited by examiner

*Primary Examiner* — Prasith Thammavong
(74) *Attorney, Agent, or Firm* — IP & T GROUP LLP

(57) ABSTRACT

Provided herein may be a memory system and a host device. The memory system may include a first memory module communicating with a host through a first interface and a second memory module communicating with the host through a second interface. The second memory module may include a memory device configured to store data and a memory controller configured to update at least one of first metadata related to a space-locality and second metadata related to a time-locality based on a result of comparing the numbers of the pages respectively corresponding to a first trigger address and a second trigger address sequentially input from the host, and to prefetch, to the first memory module, the data determined based on the first metadata and the second metadata. The first and second trigger addresses are addresses corresponding to data for which access to the first memory module is missed.

20 Claims, 12 Drawing Sheets

Associated address info

| addr pattern | trig addr1 | trig addr2 |
|---|---|---|
| addr pattern 1 | p1_addr3 | p5_addr10 |
| addr pattern 2 | p20_addr5 | p2_addr14 |

Associated page info

| page pattern | trig addr1 page | trig addr2 page |
|---|---|---|
| pg pattern 1 | 1 | 5 |
| pg pattern 2 | 20 | 2 | trig addr1 page ≠ trig addr2 page ⇧ trig addr1 page ≠ trig addr2 page ⇧

Associated address info

| addr pattern | trig addr1 | trig addr2 |
|---|---|---|
| addr pattern 1 | p1_addr3 | [p3_addr13] |
| addr pattern 2 | p20_addr5 | p2_addr14 | update

Associated page info

| page pattern | trig addr1 page | trig addr2 page |
|---|---|---|
| pg pattern 1 | 1 | [3] |
| pg pattern 2 | 20 | 2 | update

FIG. 8

Associated address info

| addr pattern | trig addr1 | trig addr2 |
|---|---|---|
| addr pattern 1 | p1_addr3 | p3_addr13 |
| addr pattern 2 | p20_addr5 | p2_addr14 |
| addr pattern 3 | p3_addr13 | p5_addr1 |
| addr pattern 4 | p2_addr3 | p12_addr10 |
| ... | ... | ... |
| addr pattern n | p10_addr14 | p25_addr9 |

Associated Page info 1215

| page pattern | trig addr1 page | trig addr2 page |
|---|---|---|
| pg pattern 1 | 1 | 3 |
| pg pattern 2 | 20 | 2 |
| pg pattern 3 | 3 | 5 |
| pg pattern 4 | 2 | 12 |
| ... | ... | ... |
| pg pattern n | 10 | 25 |

MEMORY SYSTEM AND HOST DEVICE

CROSS-REFERENCE TO RELATED APPLICATION

The present application claims priority under 35 U.S.C. § 119(a) to Korean patent application number 10-2022-0130134, filed on Oct. 12, 2022, the entire disclosure of which is incorporated herein by reference.

BACKGROUND

1. Field of Invention

Various embodiments of the present disclosure generally relate to an electronic device, and more particularly to a memory system and a host device.

2. Description of Related Art

A memory system is a device which stores data under the control of a host device such as a computer or a smartphone. The memory system may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the power supply is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

A prefetch operation is an operation of preloading data to be accessed by a host in the future based on the pattern of data previously accessed by the host. The pattern of data access by the host may be represented in the form of a space-locality pattern and a time-locality pattern. The space-locality pattern means that data, which is located close to the location of data recently accessed by a host, is highly likely to be accessed in the future. The time-locality pattern means that data recently accessed by a host is highly likely to be accessed again in the future.

SUMMARY

Various embodiments of the present disclosure are directed to a memory system and a host device that are capable of improving the accuracy of data prefetch based on the access pattern of the host.

An embodiment of the present disclosure may provide for a memory system. The memory system may include a first memory module configured to communicate with a host through a first interface and a second memory module configured to communicate with the host through a second interface, and the second memory module may include a memory device including a plurality of pages and a memory controller configured to update at least one of first metadata related to a space-locality and second metadata related to a time locality based on a result of comparing numbers of pages respectively corresponding to a first trigger address and a second trigger address sequentially input from the host and to prefetch, to the first memory module, the data determined based on the first metadata and the second metadata. The first trigger address and the second trigger address may be addresses corresponding to data for which access to the first memory module is missed.

An embodiment of the present disclosure may provide for a host device. The host device may include a main memory including a plurality of pages, a cache memory configured to cache a part of data stored in the main memory, and a processor configured to access the main memory and the cache memory. The processor may update at least one of first metadata related to a space-locality and second metadata related to a time-locality based on a result of comparing numbers of pages respectively corresponding to a first trigger address and a second trigger address, and may prefetch data from the main memory to the cache memory based on the first metadata and the second metadata. The first and second trigger addresses correspond to data for which access to the cache memory is missed.

An embodiment of the present disclosure may provide for operating method of a control circuit. The method may comprise updating space-locality metadata at each cache-miss within a first memory device, the space-locality metadata including, for each page within a second memory device, identification information of a most recent offset indicated by a cache-missed address and history information of discrepancies between offsets indicated by sequentially previous cache-missed addresses and a most recent one of the discrepancies being designated as a predict amount, determining a space-locality prediction address when a cache-miss currently occurs, and controlling the first and second memory devices for the first memory device to cache therein space-locality data from a location indicated by the space-locality prediction address within the second memory device. The determining of the space-locality prediction address may include identifying, from the space-locality metadata, first identification and first history information corresponding to a cache-missed address of the current cache-miss, detecting, from the space-locality metadata, second history information having a most similar pattern of the discrepancies to the first history information, and determining the space-locality prediction address that is a sum of the most recent offset from the first identification information and the predict amount from the second history information.

The method may further comprise updating time-locality metadata for cache-misses within the first memory device, the cache-misses corresponding to cache-miss addresses indicating different pages within the second memory device, the time-locality metadata including plural patterns each having sequential first and second cache-miss addresses and the first cache-miss addresses within the respective patterns indicating different pages, determining a time-locality prediction address when the cache-miss currently occurs, and controlling the first and second memory devices for the first memory device to cache therein time-locality data from a location indicated by the time-locality prediction address within the second memory device. The determining of the time-locality prediction address may include identifying, from the time-locality metadata, the second cache-miss address within the pattern having, as the first cache-miss address, the cache-miss address of the current cache-miss, identifying, from the space-locality metadata, second identification and third history information corresponding to the identified second cache-missed address, detecting, from the space-locality metadata, fourth history information having a most similar pattern of the discrepancies to the third history information, and determining the time-locality prediction address that is a sum of the most recent offset from the second identification information and the predict amount from the fourth history information.

The method may further comprise updating time-locality metadata for cache-misses within the first memory device, the cache-misses corresponding to cache-miss addresses indicating different pages within the second memory device, the time-locality metadata including plural patterns each having sequential first and second cache-miss addresses and the first cache-miss addresses within the respective patterns indicating different pages, determining a time-locality prediction address when the cache-miss currently occurs, and controlling the first and second memory devices for the first memory device to cache therein time-locality data from a location indicated by the time-locality prediction address within the second memory device. The determining of the time-locality prediction address may include identifying, from the time-locality metadata, the second cache-miss address within the pattern having, as the first cache-miss address, the cache-miss address of the current cache-miss, and determining the identified second cache-miss address as the time-locality prediction address.

BRIEF DESCRIPTION OF THE DRAWINGS

FIG. 7 is a diagram for describing an operation of updating time-locality metadata according to an embodiment of the present disclosure.

FIG. 8 is a diagram for describing associated address information and associated page information according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
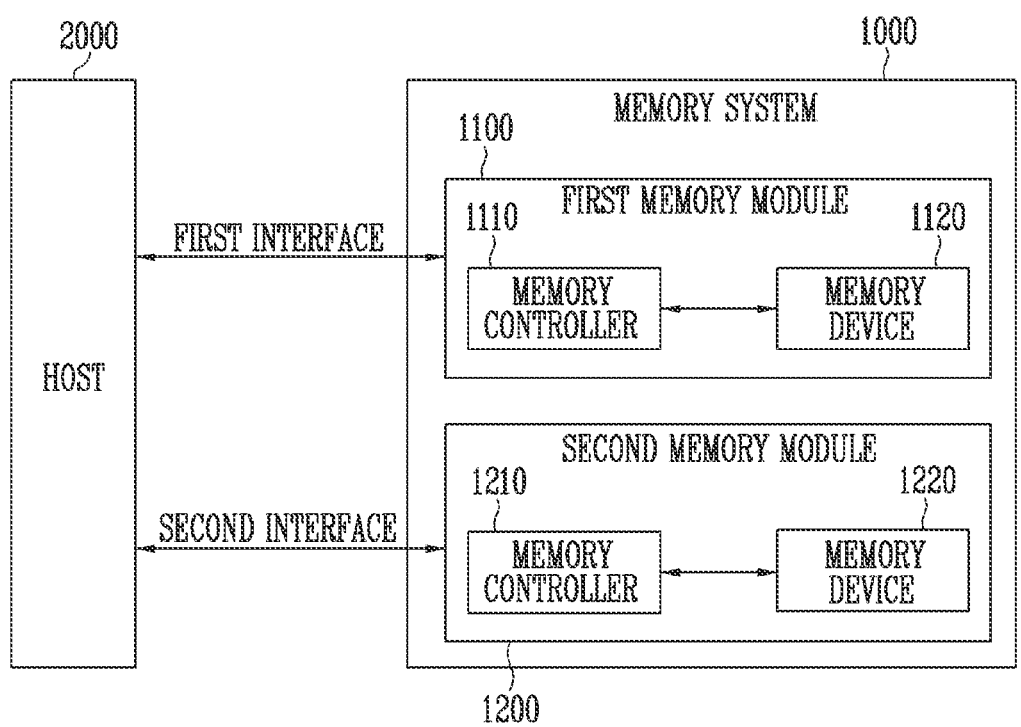
FIG. 1 is a diagram illustrating a computing system including a memory system according to an embodiment of the present disclosure.

FIG. 1 is a diagram illustrating a computing system 50 including a memory system 1000 according to an embodiment of the present disclosure.

Referring to FIG. 1, the computing system 50 may include the memory system 1000 and a host 2000.

The memory system 1000 may be a device which stores data under the control of the host 2000, such as a mobile phone, a smartphone, an MP3 player, a laptop computer, a desktop computer, a game console, a TV, a tablet PC, or an in-vehicle infotainment system.

The memory system 1000 may be manufactured as any of various types of storage devices depending on a host interface that is a scheme for communication with the host 2000. For example, the memory system 1000 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The memory system 1000 may be manufactured in any of various types of package forms. For example, the memory system 1000 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory system 1000 may include one or more memory modules. In an embodiment, the memory system 1000 may include a first memory module 1100 and a second memory module 1200. The number of memory modules is not limited to embodiments.

The first memory module 1100 may include a memory device 1120 and a memory controller 1110 which controls the memory device 1120. The first memory module 1100 may communicate with the host 2000 through a first interface.

The second memory module 1200 may include a memory device 1220 and a memory controller 1210 which controls the memory device 1220. The second memory module 1200 may communicate with the host 2000 through a second interface.

The first interface and the second interface may be different types of interfaces. In an embodiment, the first interface may include a dual inline memory module (DIMM) interface, and the second interface may be a compute express link (CXL) interface.

In an embodiment, the first memory module 1100 may be a first tier memory, and the second memory module 1200 may be a second tier memory. The second tier memory may be a memory with a lower priority than the first tier memory module when accessed by the host 2000.

In an embodiment, the host 2000 may first access the first tier memory and then access the second tier memory to obtain required data. When required data is not stored in the first tier memory, the host 2000 may request the required data from the second tier memory. That is, when access to the first tier memory is missed, the host 2000 may access the second tier memory.

The first memory module 1100 and the second memory module 1200 may include the memory device 1120 and the memory device 1220, respectively.

Each of the memory devices 1120 and 1220 may store data. The memory devices 1120 and 1220 may be operated in response to the control of the memory controllers 1110 and 1210, respectively. In an embodiment, each of the memory devices 1120 and 1220 may include a plurality of pages in which data is stored.

In an embodiment, each of the memory devices 1120 and 1220 may be a volatile memory device or a nonvolatile memory device. In an embodiment, each of the memory devices 1120 and 1220 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (SU-RAM).

The memory devices 1120 and 1220 may receive a command and an address from the memory controllers 1110 and 1210, respectively, and may access an area selected by the address. Each of the memory devices 1120 and 1220 may perform an operation indicated by the command on the area selected by the address. For example, each of the memory devices 1120 and 1220 may perform a write operation, a read operation, and an erase operation. During a write operation, each of the memory devices 1120 and 1220 may store data in the area selected by the address. During a read operation, each of the memory devices 1120 and 1220 may read data from the area selected by the address. During an erase operation, each of the memory devices 1120 and 1220 may erase data stored in the area selected by the address.

The first memory module 1100 and the second memory module 1200 may include the memory controllers 1110 and 1210, respectively. Each of the memory controllers 1110 and 1210 may control the overall operation of the memory system 1000.

When power is applied to the memory system 1000, each of the memory controllers 1110 and 1210 may run firmware (FW). In an embodiment, each of the memory controllers 1110 and 1210 may receive data and a logical address from the host 2000, and may translate the logical address into a physical address of a corresponding one of the memory devices 1120 and 1220.

The memory controllers 1110 and 1210 may control the memory devices 1120 and 1220, respectively, so that a write operation, a read operation or an erase operation is performed in response to a request received from the host 2000. In an embodiment, the memory controllers 1110 and 1210 may transmit the command, address, and data to the memory devices 1120 and 1220, respectively.

The host 2000 may communicate with the memory system 1000 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), and compute express link (CXL) communication methods.

Figure 2:
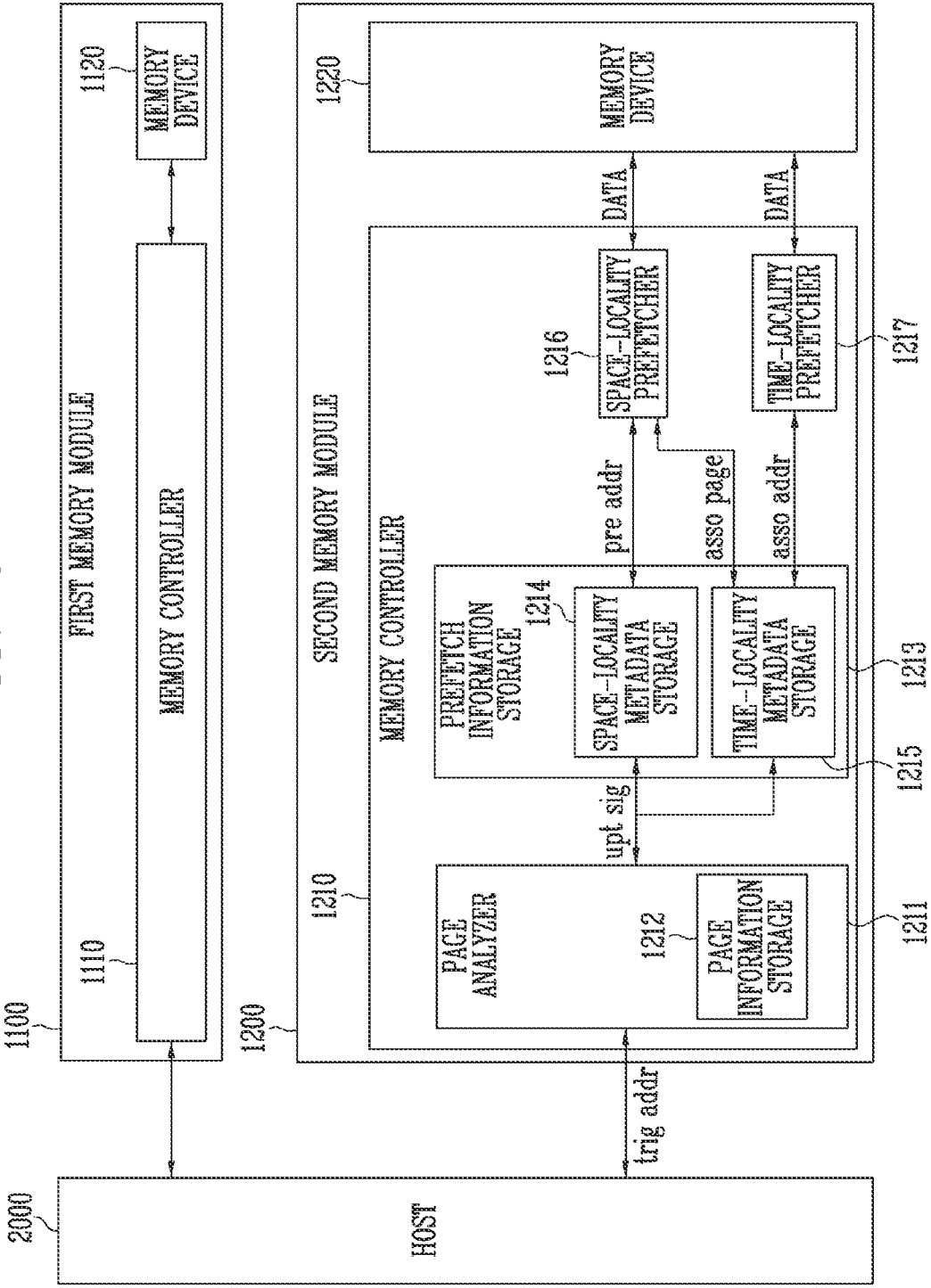
FIG. 2 is a diagram for describing a prefetch operation of a memory system according to an embodiment of the present disclosure.

FIG. 2 is a diagram for describing a prefetch operation of a memory system according to an embodiment of the present disclosure.

Referring to FIG. 2, a second memory module 1200 may include a memory controller 1210 and a memory device 1220. The memory controller 1210 may include a page analyzer 1211, a prefetch information storage 1213, a space-locality prefetcher 1216, and a time-locality prefetcher 1217.

The page analyzer 1211 may receive a trigger address (trig addr) from a host 2000. The trigger address (trig addr) may be an address corresponding to data for which access to a first memory module 1100 is missed. Specifically, the host 2000 may access the first memory module 1100 first in order to acquire data. However, when the data the host 2000 intends to acquire is not stored in the first memory module 1100, the access to the first memory module 1100 may be missed. Then, the host 2000 may access the second memory module 1200 in order to acquire the data. Here, the address corresponding to the data the host 2000 intends to acquire may be the trigger address.

The page analyzer 1211 may store the trigger addresses received from the host 2000 and the numbers of the pages respectively corresponding to the trigger addresses. The trigger addresses and the numbers of the pages respectively corresponding to the trigger addresses may be stored in a page information storage 1212 included in the page analyzer 1211.

The page analyzer 1211 may compare the numbers of the pages respectively corresponding to the trigger addresses sequentially input from the host 2000. In an embodiment, the page analyzer 1211 may sequentially receive a first trigger address and a second trigger address from the host 2000. The second trigger address may be the address that is currently input from the host 2000, and the first trigger address may be an address that is input before the second trigger address.

The page analyzer 1211 may update the metadata stored in the prefetch information storage 1213 based on the result of comparing the numbers of the pages respectively corresponding to the sequentially input trigger addresses.

In an embodiment, when the numbers of the pages respectively corresponding to the first trigger address and the second trigger address, which are sequentially input, are equal to each other, the page analyzer 1211 may update metadata related to a space-locality. In an embodiment, when the numbers of the pages respectively corresponding to the first trigger address and the second trigger address, which are sequentially input, are different from each other, the page analyzer 1211 may update metadata related to a time-locality. In another embodiment, when the numbers of the pages respectively corresponding to the first trigger address and the second trigger address, which are sequentially input, are different from each other, the page analyzer 1211 may update the metadata related to a space-locality and the metadata related to a time-locality.

The page analyzer 1211 may provide the prefetch information storage 1213 with an update signal (upt sig) for updating at least one of the metadata related to a space-locality and the metadata related to a time-locality based on the result of comparing the numbers of the pages respectively corresponding to the sequentially input trigger addresses.

The prefetch information storage 1213 may store metadata that is used to perform a prefetch operation. The prefetch operation may be an operation of providing data predicted to be requested by the host 2000, among pieces of data stored in the memory device 1220, to the first memory module 1100. The second memory module 1200 may prefetch the data determined based on the metadata stored in the prefetch information storage 1213 to the first memory module 1100. In an embodiment, the prefetch information storage 1213 may be a volatile memory device. For example, the prefetch information storage 1213 may be a Dynamic Random Access Memory (DRAM) or a Static Random Access Memory (SRAM). The prefetch information storage 1213 may be included in the memory controller 1210, or may be located outside the memory controller 1210.

The prefetch information storage 1213 may include a space-locality metadata storage 1214 and a time-locality metadata storage 1215.

The space-locality metadata storage 1214 may store metadata related to a space-locality. The metadata related to a space-locality may include page history information and information about a prefetch address. The page history information may be information about a variation between the offset values of trigger addresses corresponding to any page included in the memory device 1220. The variation may be a value indicating an increment or a decrement between the offset values. For example, when the offset values are 10 and 20, the variation may be 10 because the value increases from 10 to 20. That is, the variation between the offset values and 20 may be 10. In another example, when the offset values are 20 and 10, the variation may be −10 because the value decreases from 20 to 10. That is, the variation between the offset values 20 and 10 may be −10.

The information about a prefetch address may be information about an address determined based on the variation pattern of a page.

In an embodiment, the metadata related to a space-locality may be updated when the respective page numbers of the first trigger address and the second trigger address sequentially input from the host 2000 are equal to each other. In another embodiment, the metadata related to a space-locality may be updated when the respective page numbers of the first trigger address and the second trigger address sequentially input from the host 2000 are different from each other.

The time-locality metadata storage 1215 may store metadata related to a time-locality. The metadata related to a time-locality may include information about associated addresses and information about associated pages. The information about associated addresses may be information about mapping of the trigger addresses, sequentially input from the host 2000, to the associated addresses when page numbers of the trigger addresses are different. The information about associated pages may be information about mapping of the respective pages indicated by the trigger addresses, sequentially input from the host 2000, to the associated pages. In an embodiment, the metadata related to a time-locality may be updated when the respective page numbers of the first trigger address and the second trigger address sequentially input from the host 2000 are different from each other.

The space-locality prefetcher 1216 may prefetch data determined based on the metadata related to a space-locality, among pieces of data stored in the memory device 1220. The space-locality prefetcher 1216 may be provided with a prefetch address (pre addr) from the space-locality metadata storage 1214. The space-locality prefetcher 1216 may prefetch the data corresponding to the prefetch address, among pieces of data stored in the memory device 1220.

In an embodiment, the space-locality prefetcher 1216 may be provided with information about a page (asso page) associated with the page corresponding to the trigger address from the time-locality metadata storage 1215. The space-locality prefetcher 1216 may be provided with the prefetch address (pre addr) of the associated page determined based on the variation pattern of the associated page, which is stored in the space-locality metadata storage 1214. The space-locality prefetcher 1216 may prefetch the data corresponding to the prefetch address of the associated page, among pieces of data stored in the memory device 1220.

The time-locality prefetcher 1217 may prefetch data determined based on the metadata related to a time-locality, among pieces of data stored in the memory device 1220. The time-locality prefetcher 1217 may be provided with the associated trigger address (asso addr) associated with the second trigger address, which is currently input from the host, from the time-locality metadata storage 1215. The time-locality prefetcher 1217 may prefetch the data corresponding to the associated trigger address, among pieces of data stored in the memory device 1220.

Figure 3:
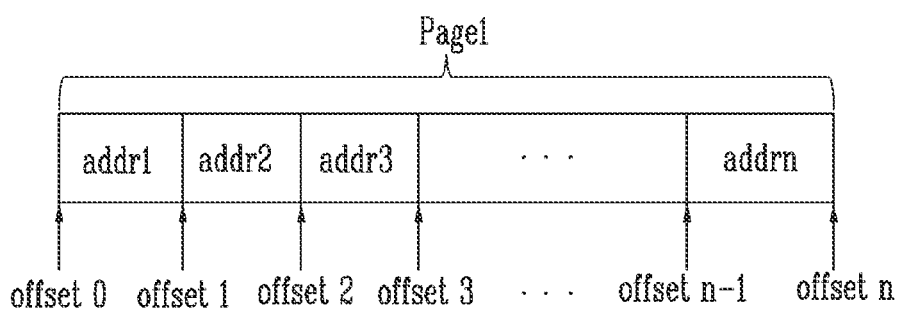
FIG. 3 is a diagram for describing a page offset according to an embodiment of the present disclosure.

FIG. 3 is a diagram for describing a page offset according to an embodiment of the present disclosure.

Referring to FIG. 3, the memory device 1220 illustrated in FIG. 2 may include a plurality of pages. A page may be a unit for storing data. Each piece of data stored in the page may correspond to each address. Each of the plurality of pages may correspond to a plurality of addresses. In an embodiment, the plurality of addresses may include first to n-th addresses addr1 to addrn. As illustrated in FIG. 3, describing addresses corresponding to a first page Page1 as an example, the offset value of the first address corresponding to the first page may be 1. Also, the offset value of the second address addr2 corresponding to the first page may be 2. Likewise, the respective offset values of the third to n-th addresses addr3 to addrn may be 3 to n.

Figure 4:
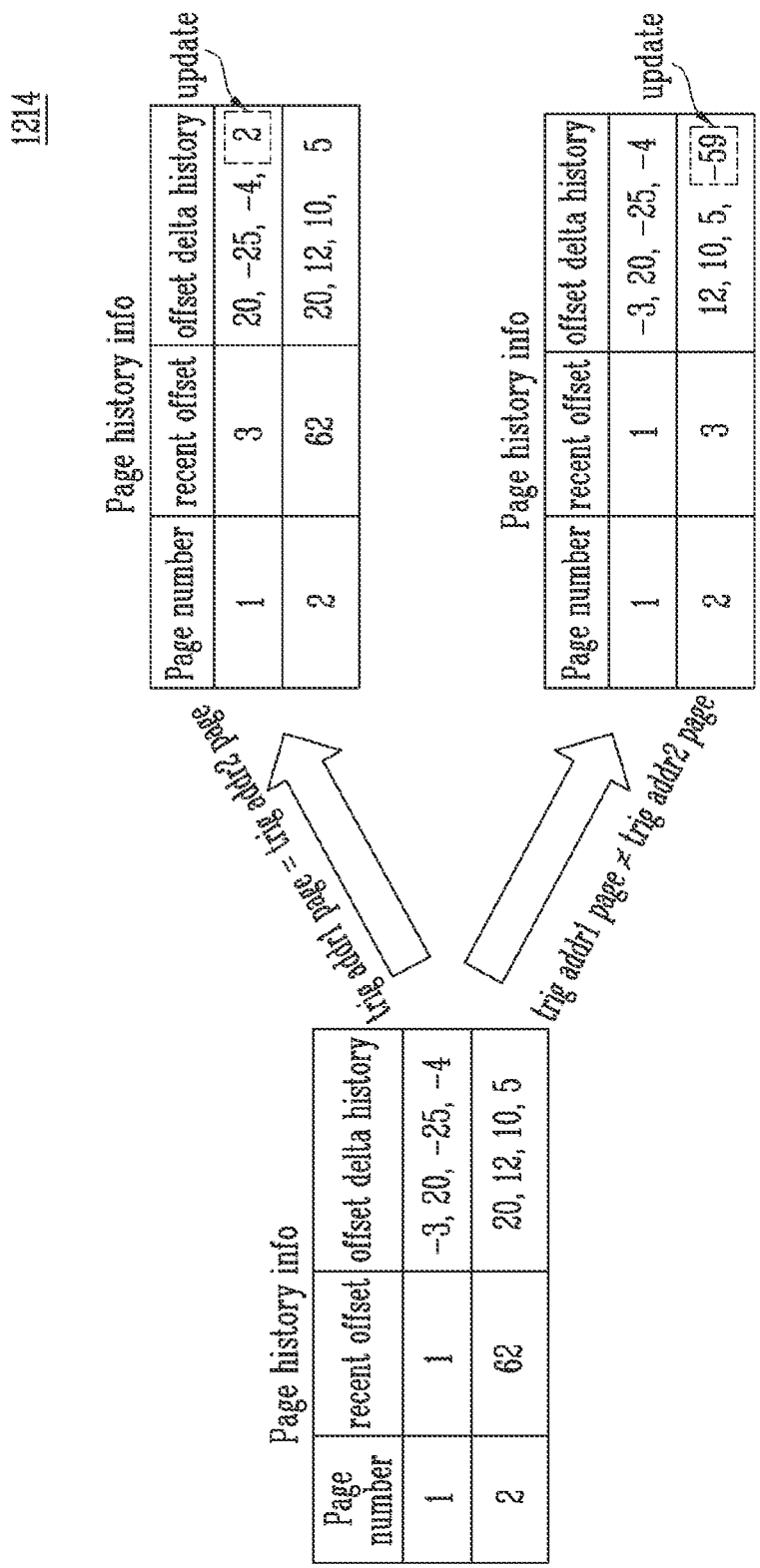
FIG. 4 is a diagram for describing an operation of updating page history information according to an embodiment of the present disclosure.

FIG. 4 is a diagram for describing an operation of updating page history information according to an embodiment of the present disclosure.

The space-locality metadata storage 1214 illustrated in FIG. 2 may store page history information (Page history info).

The table illustrated on the left side of FIG. 4 represents page history information (Page history info) before being updated, and the table illustrated on the right side of FIG. 4 represents the page history information (Page history info) after being updated. Referring to FIG. 4, the page history information (Page history info) may include a recent offset value for each page and information about a variation between offset values (offset delta history). The variation may be a value indicating an increment or a decrement between the offset values. Here, the offset value may be the offset value of a trigger address. Also, the variation between the offset values may be a variation between the offset values of trigger addresses. In an embodiment, the information about the variation (offset delta history) may include information about n variations. In FIG. 4, the case including information about four variations is described as an example.

For example, when the offset values of the trigger addresses corresponding to a first page are 13, 10, 30, 5, and 1, because the last offset value of the first page is 1, the recent trigger address offset value of the first page may be 1. Also, the variation (delta value) from 13 to 10 is −3, the variation from 10 to 30 is 20, the variation from 30 to 5 is −25, and the variation from 5 to 1 is −4. Accordingly, the variations of the first page may be −3, 20, −25, and −4.

In another example, when the offset values of the trigger addresses corresponding to a second page are 15, 35, 47, 57, and 62, because the last offset value of the second page is 62, the recent trigger address offset value of the second page may be 62. Also, the variation from 15 to 35 is 20, the variation from 35 to 47 is 12, the variation from 47 to 57 is 10, and the variation from 57 to 62 is 5. Accordingly, the variations of the second page may be 20, 12, 10, and 5.

The page history information (Page history info) may be updated based on whether the respective page numbers of a first trigger address and a second trigger address sequentially input from a host are equal to each other.

In an embodiment, when the page number of the second trigger address is equal to the page number of the first trigger address, which is input before the second trigger address, the variation of the page corresponding to the first to second trigger addresses may be updated. For example, when all of the page numbers of the first trigger address and the page numbers of the second trigger address correspond to the first page, as illustrated in FIG. 4, the variation of the first page may be updated. Specifically, when the offset value of the second trigger address is 3, the recent offset value of the first page may be updated from 1 to 3. Also, because the variation from 1 to 3 is 2, the variations of the first page may be updated to 20, −25, −4, and 2.

In an embodiment, when the page number of the second trigger address is different from the page number of the first trigger address, which is input before the second trigger address, the page history information (Page history info) may not be updated. For example, when the respective page numbers of the second trigger address and the first trigger address are different from each other, the variations of the first page may be −3, 20, −25, and −4, and the variations of the second page may be 20, 12, 10 and 5.

In another embodiment, when the page number of the second trigger address is different from the page number of the first trigger address, which is input before the second trigger address, the variation of the page corresponding to the second trigger address may be updated. For example, when the page number of the first trigger address is the first page and when the page number of the second trigger address is the second page, the variation of the second page may be updated. Specifically, when the offset value of the second trigger address is 3, the recent offset value of the second page may be updated from 62 to 3. Also, because the variation from 62 to 3 is −59, the variations of the second page may be updated to 12, 10, 5, and −59.

Figure 5:
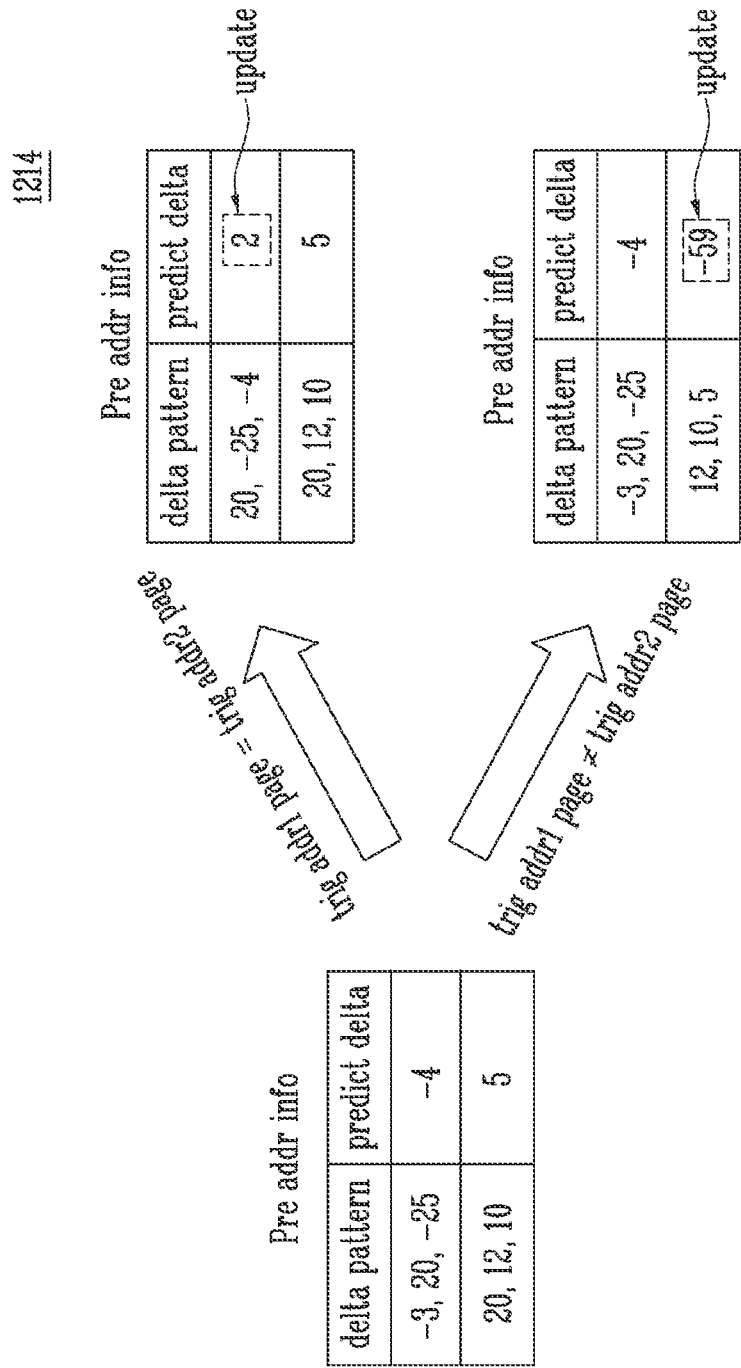
FIG. 5 is a diagram for describing an operation of updating a predicted variation according to an embodiment of the present disclosure.

FIG. 5 is a diagram for describing an operation of updating a predicted variation according to an embodiment of the present disclosure.

The space-locality metadata storage 1214 illustrated in FIG. 2 may store information about a prefetch address (Pre addr info). In FIG. 5, a predicted variation (predict delta) included in the information about a prefetch address (Pre addr info) is described, and the information about a prefetch address (Pre addr info) will be additionally described with reference to FIG. 6.

The table illustrated on the left side of FIG. 5 represents the information about a prefetch address (Pre addr info) before being updated, and the table illustrated on the right side of FIG. 5 represents the information about a prefetch address (Pre addr info) after being updated.

Referring to FIG. 5, a predicted variation (predict delta) may be determined based on the information about the variations (offset delta history) illustrated in FIG. 4. Because the variations of the first page in FIG. 4 are −3, 20, −25, and −4, the variation after the variations −3, 20, and −25 may be predicted to be −4. That is, when a variation pattern comprises −3, 20, and −25, the predicted variation (predict delta) may be −4. Likewise, because the variations of the second page in FIG. 4 are 20, 12, 10, and 5, the variation after the variations 20, 12, and 10 may be predicted to be 5. That is, the predicted variation (predict delta) corresponding to the variation pattern comprising 20, 12, and 10 may be 5.

The predicted variation (predict delta) may be updated based on whether the respective page numbers of the first trigger address and the second trigger address sequentially input from the host are equal to each other.

In an embodiment, when the page number of the second trigger address is equal to the page number of the first trigger address, which is input before the second trigger address, the variation of the page corresponding to the first to second trigger addresses may be updated. Also, the predicted variation (predict delta) may be updated based on the variations of the page corresponding to the first to second trigger addresses. For example, when the variations of the first page are updated to 20, −25, −4, and 2, as described with reference to FIG. 4, because the variation pattern is updated to comprise 20, −25, and −4, the predicted variation (predict delta) may be updated to 2.

In an embodiment, when the page number of the second trigger address is different from the page number of the first trigger address, which is input before the second trigger address, the predicted variation (predict delta) may not be updated. For example, when the respective page numbers of the second trigger address and the first trigger address are different from each other, the predicted variation (predict delta) of the variation pattern comprising −3, 20, and −25 may be −4, and the predicted variation (predict delta) of the variation pattern comprising 20, 12, and 10 may be 5.

In another embodiment, when the page number of the second trigger address is different from the page number of the first trigger address, which is input before the second trigger address, the variation of the page corresponding to the second trigger address may be updated. Also, the predicted variation (predict delta) may be updated based on the variations of the page corresponding to the second trigger address. For example, when the variations of the second page are updated to 12, 10, 5, and −59, as described with reference to FIG. 4, because the variation pattern is updated to comprise 12, 10, and 5, the predicted variation (predict delta) may be updated to −59.

Figure 6:
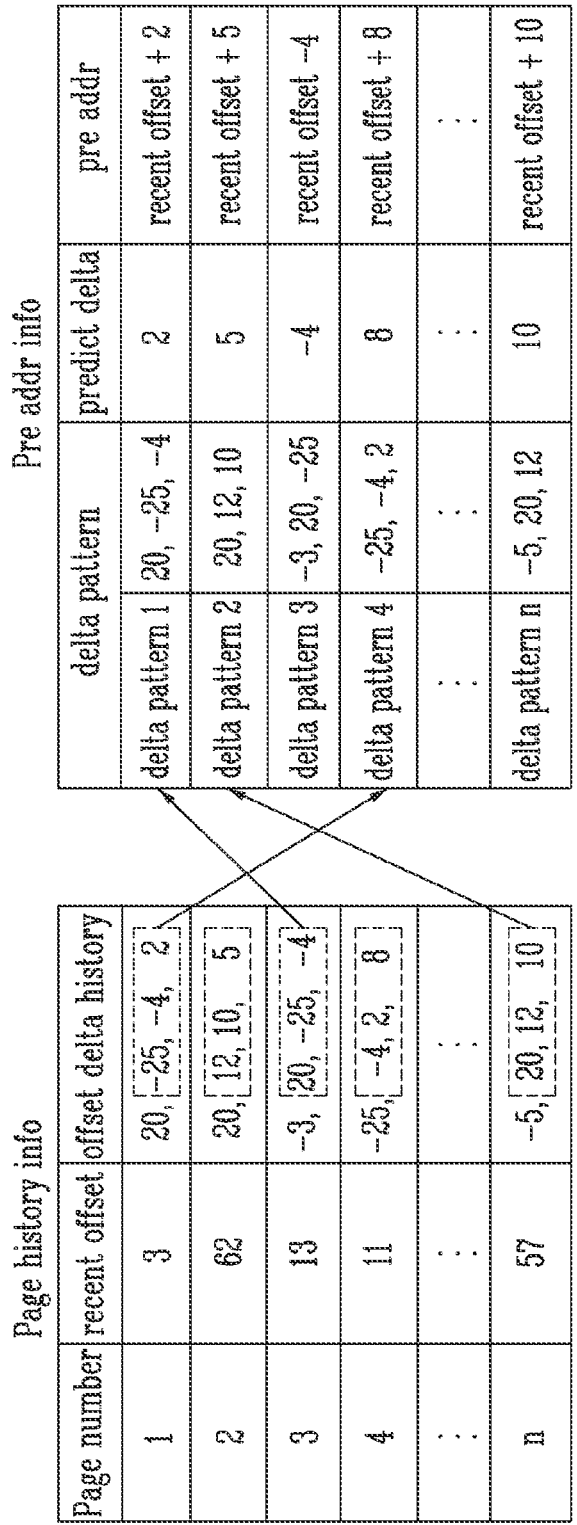
FIG. 6 is a diagram for describing a prefetch address determined based on a variation pattern of a page according to an embodiment of the present disclosure.

FIG. 6 is a diagram for describing a prefetch address determined based on the variation pattern of a page according to an embodiment of the present disclosure.

The space-locality metadata storage 1214 illustrated in FIG. 2 may store page history information (Page history info) and information about a prefetch address (Pre addr info). Referring to FIG. 6, the page history information (Page history info) may include a recent offset value for each page and information about a variation (offset delta history). The information about a prefetch address (Pre addr info) may include a predicted variation (predict delta) corresponding to each variation pattern and a prefetch address (pre addr) corresponding thereto.

In an embodiment, the variations of the first page may be 20, —25, −4, and 2. Here, because the variation pattern comprises 20, −25, and −4, the predicted variation (predict delta) may be 2. That is, the predicted variation (predict delta) corresponding to a first variation pattern (delta pattern 1) may be 2. The predicted variation (predict delta) corresponding to 20, 12, and 10, which constitute a second variation pattern (delta pattern 2), may be 5. The predicted variation (predict delta) corresponding to −3, 20, and −25, which constitute a third variation pattern (delta pattern 3), may be −4. The predicted variation (predict delta) corresponding to −25, −4, and 2, which constitute a fourth variation pattern (delta pattern 4), may be 8. The predicted variation (predict delta) corresponding to −5, 20, and 12, which constitute an n-th variation pattern (delta pattern n), may be 10.

In an embodiment, the second memory module 1200 may determine a prefetch address based on the predicted variation corresponding to the pattern of recent n variations. In FIG. 6, the case in which a prefetch address is determined based on the predicted variation corresponding to the pattern of recent three variations is described as an example.

Specifically, when the second trigger address input from the host is the third address of the first page, because the pattern of the recent variations of the first page comprises −25, −4, and 2, this may be a variation pattern corresponding to the fourth variation pattern (delta pattern 4). Also, because the predicted variation (predict delta) corresponding to the fourth variation pattern (delta pattern 4) is 8, the third trigger address to be input after the second trigger address may be predicted to be the 11th address, which is a value changing by 8 from 3 that is the offset value of the third address of the first page. Accordingly, the space-locality prefetcher 1216 illustrated in FIG. 2 may prefetch the data corresponding to the 11th address of the first page, which is the prefetch address determined based on the pattern of the recent variations of the first page, to the first memory module 1100.

In another example, when the second trigger address input from the host is the 13th address of the third page, because the pattern of the recent variations of the third page comprises 20, −25, and −4, this may be a variation pattern corresponding to the first variation pattern (delta pattern 1). Also, because the predicted variation (predict delta) corresponding to the first variation pattern (delta pattern 1) is 2, the third trigger address to be input after the second trigger address may be predicted to be the 15th address, which is a value changing by 2 from 13 that is the offset value of the 13th address of the third page. Accordingly, the space-locality prefetcher 1216 illustrated in FIG. 2 may prefetch the data corresponding to the 15th address of the third page, which is the prefetch address determined based on the pattern of the recent variations of the third page, to the first memory module 1100.

In another example, when the second trigger address input from the host is the 57th address of the n-th page, because the pattern of the recent variations of the n-th page comprises 20, 12, and 10, these may be variations corresponding to the second variation pattern (delta pattern 2). Also, because the predicted variation (predict delta) corresponding to the second variation pattern (delta pattern 2) is 5, the third trigger address to be input after the second trigger address may be predicted to be the 62th address, which is a value changing by 5 from 57 that is the offset value of the 57th address of the n-th page. Accordingly, the space-locality prefetcher 1216 illustrated in FIG. 2 may prefetch the data corresponding to the 62th address of the n-th page, which is the prefetch address determined based on the pattern of the recent variations of the n-th page, to the first memory module 1100. In FIG. 6, the case in which the recent three variations constitute a single variation pattern is described as an example, but the number of recent variations determined to constitute a single variation pattern is not limited to the present embodiment. FIG. 7 is a diagram for describing an operation of updating time-locality metadata according to an embodiment of the present disclosure.

The time-locality metadata storage 1215 illustrated in FIG. 2 may store information about associated addresses (Associated address info) and information about associated pages (Associated page info).

The tables illustrated on the left side of FIG. 7 represent information about associated addresses (Associated address info) and information about associated pages (Associated page info) before being updated, and the tables illustrated on the right side of FIG. 7 represent the information about associated addresses (Associated address info) and the information about associated pages (Associated page info) after being updated. In FIG. 7, the first trigger address (trig addr1) may indicate a trigger address input before the second trigger address (trig addr2). In FIG. 7, the second trigger address (trig addr2) may indicate a trigger address input after the first trigger address (trig addr1).

Referring to FIG. 7, the information about associated addresses (Associated address info) may be information about mapping of trigger addresses, sequentially input from a host, to associated addresses. The numbers of the pages respectively corresponding to the sequentially input trigger addresses may be different from each other.

In an embodiment, when the page number of the second trigger address is different from the page number of the first trigger address, which is input before the second trigger address, the information about associated addresses (Associated address info) may be updated. For example, before the information about associated addresses (Associated address info) is updated, the third address of the first page (p1_addr3), which is the first trigger address, and the tenth address of the fifth page (p5_addr10), which is the second trigger address, may be mapped to each other as the associated addresses. Subsequently, when the first trigger address input from the host is the third address of the first page (p1_addr3) and the second trigger address input from the host is the 13th address of the third page (p3_addr13), because the first trigger address is the first page and the second trigger address is the third page, the information about associated addresses (Associated address info) may be updated. Specifically, the third address of the first page (p1_addr3) may be mapped as the address associated with the 13th address of the third page (p3_addr13). That is, after the third address of the first page (p1_addr3) is input, it may be predicted that the 13th address of the third page (p3_addr3) will be input.

The information about associated pages (Associated page info) may be information about mapping of pages respectively corresponding to the trigger addresses, sequentially input form the host, to associated pages. The numbers of the pages respectively corresponding to the sequentially input trigger addresses may be different from each other.

In an embodiment, when the page number of the second trigger address is different from the page number of the first trigger address, which is input before the second trigger address, the information about associated pages (Associated page info) may be updated. For example, before the information about associated pages (Associated page info) is updated, the first page, which is a page corresponding to the first trigger address, and the fifth page, which is a page corresponding to the second trigger address, may be mapped to each other as the associated pages. Subsequently, when the second trigger address input from the host is the third page, because the first trigger address is the first page and the second trigger address is the third page, the information about associated pages (Associated page info) may be updated. Specifically, the first page and the third page may be mapped to each other as the associated pages. That is, after a trigger address corresponding to the first page is input, it may be predicted that a trigger address corresponding to the third page will be input.

FIG. 8 is a diagram for describing associated address information and associated page information according to an embodiment of the present disclosure.

The time-locality metadata storage 1215 illustrated in FIG. 2 may store information about associated addresses (Associated address info) and information about associated pages (Associated Page info). In FIG. 8, the first trigger address (trig addr1) may indicate a trigger address input before the second trigger address (trig addr2). In FIG. 8, the second trigger address (trig addr2) may indicate a trigger address input after the first trigger address (trig addr1).

Referring to the information about associated addresses (Associated address info) illustrated in FIG. 8, the address associated with the third address of the first page (p1_addr3) may be the 13th address of the third page (p3_addr13). The third address of the first page (p1_addr3) and the 13th address of the third page (p3_addr13) may constitute a first address pattern (addr pattern 1). After the third address of the first page (p1_addr3) is input, it may be predicted that the 13th address of the third page (p3_addr13) will be input. Accordingly, when the second trigger address input from the host is the third address of the first page (p1_addr3), the time-locality prefetcher 1217 illustrated in FIG. 2 may prefetch the data corresponding to the 13th address of the third page (p3_addr13), which is associated with the third address of the first page, to the first memory module 1100.

The address associated with the 13th address of the third page (p3_addr13) may be the first address of the fifth page (p5_addr1). The 13th address of the third page (p3_addr13) and the first address of the fifth page (p5_addr1) may constitute a third address pattern (addr pattern 3). After the 13th address of the third page (p3_addr13) is input, it may be predicted that the first address of the fifth page (p5_addr1) will be input. Accordingly, when the second trigger address input from the host is the 13th address of the third page (p3_addr13), the time-locality prefetcher 1217 illustrated in FIG. 2 may prefetch the data corresponding to the first address of the fifth page (p5_addr1), which is associated with the 13th address of the third page, to the first memory module 1100.

Referring to the information about associated pages (Associated page info) illustrated in FIG. 8, the page corresponding to the first trigger address may be the first page, and the page corresponding to the second trigger address may be the third page. That is, the page associated with the first page may be the third page. The first page and the third page may constitute a first page pattern (pg pattern 1). After a trigger address corresponding to the first page is input, it may be predicted that a trigger address corresponding to the third page will be input.

When the second trigger address is the third address of the first page, the space-locality prefetcher 1216 illustrated in FIG. 2 may prefetch the data corresponding to a first prefetch address determined based on the variation pattern of the first page and the data corresponding to a second prefetch address determined based on the variation pattern of the third page associated with the first page to the first memory module 1100. Specifically, describing this with reference to FIG. 6, 20, −25, and −4, which constitute the pattern of the recent variations of the third page, may be a variation pattern corresponding to the first variation pattern (delta pattern 1). Also, because the predicted variation (predict delta) corresponding to the first variation pattern (delta pattern 1) is 2, the third trigger address to be input after the second trigger address may be predicted to be the 15th address, which is a value changing by 2 from 13 that is the offset value of the 13th address of the third page. That is, when the second trigger address is the third address of the first page, the space-locality prefetcher 1216 may prefetch the data corresponding to the 11th address of the first page, which is determined based on the variation pattern of the first page, and the data corresponding to the 15th address of the third page, which is determined based on the variation pattern of the third page associated with the first page, to the first memory module 1100.

Figure 9:
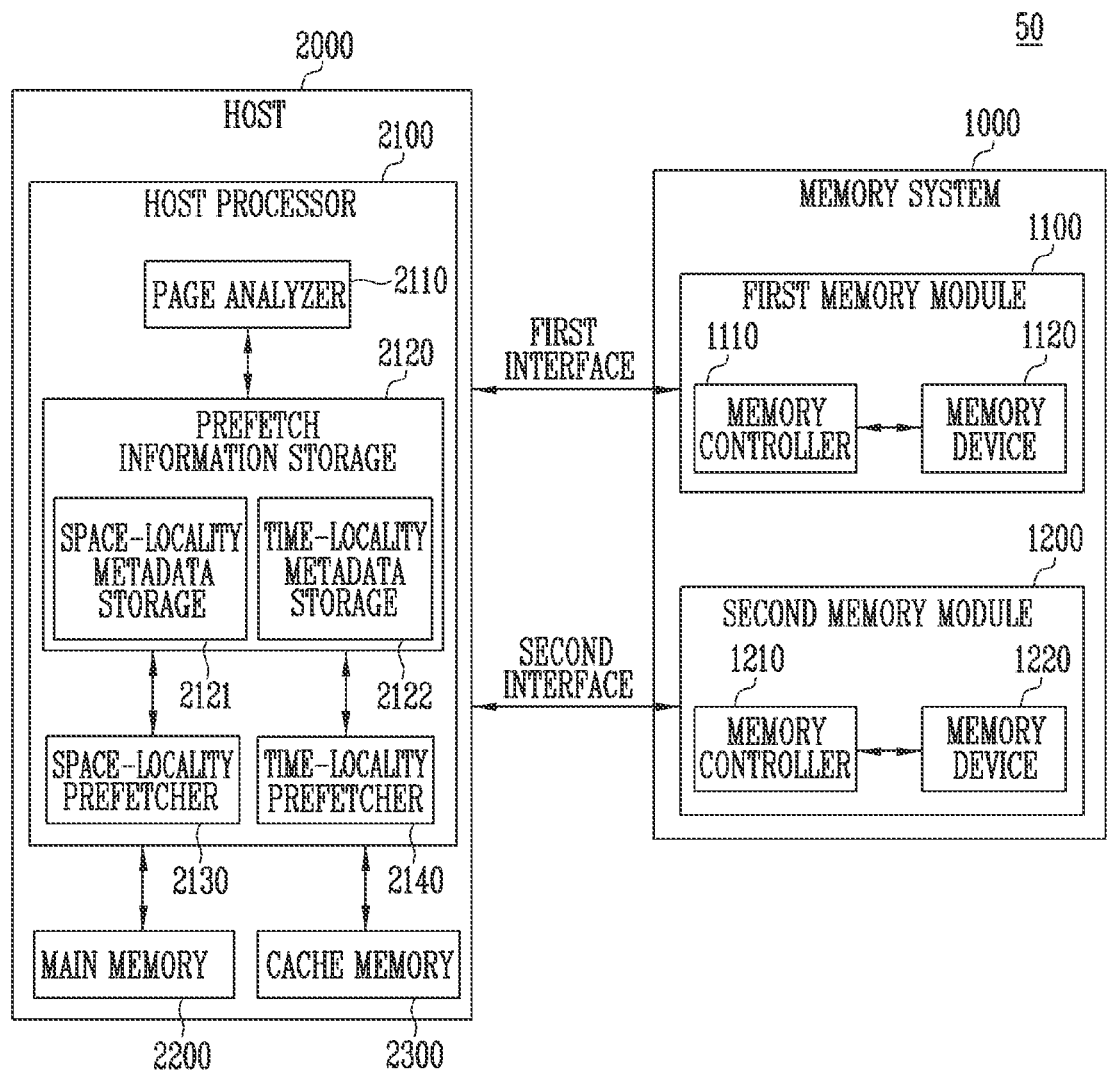
FIG. 9 is a diagram a prefetch operation of a host according to an embodiment of the present disclosure.

FIG. 9 is a diagram for describing a prefetch operation of a host according to an embodiment of the present disclosure.

Referring to FIG. 9, a computing system 50 may include a memory system 1000 and a host 2000.

The memory system 1000 may include a first memory module 1100 and a second memory module 1200. Each of the first memory module 1100 and the second memory module 1200 may include a memory controller 1110 or 1210 and a memory device 1120 or 1220.

The host 2000 may include a host processor 2100, a main memory 2200, and a cache memory 2300. The host processor 2100 may control the overall operation of the host 2000. The host processor 2100 may access the cache memory 2300 first in order to acquire necessary data, and may then access the main memory 2200. When the necessary data is not stored in the cache memory 2300, the host processor 2100 may request the necessary data from the main memory 2200. When the data requested by the host processor is cached in the cache memory 2300, which may be a cache hit. When the data requested by the host processor is not cached in the cache memory 2300, which may be a cache miss. When the access to the cache memory 2300 is missed, the host processor 2100 may access the main memory 2200.

The main memory 2200 may store data. In an embodiment, the main memory may include a plurality of pages. Each page may be a unit for storing data. In an embodiment, the main memory may be a Dynamic Random Access Memory (DRAM).

The cache memory 2300 may store part of the data stored in the main memory. The cache memory 2300 may store the data the host processor 2100 requests from the main memory 2200.

The host processor 2100 may include a page analyzer 2110, a prefetch information storage 2120, a space-locality prefetcher 2130, and a time-locality prefetcher 2140. The page analyzer 2110, the prefetch information storage 2120, the space-locality prefetcher 2130, and the time-locality prefetcher 2140 illustrated in FIG. 9 may be configured and operated in the same manner as the page analyzer 1211, the prefetch information storage 1213, the space-locality prefetcher 1216, and the time-locality prefetcher 1217 illustrated in FIG. 2.

The page analyzer 2110 may receive a trigger address. The trigger address may be an address corresponding to data for which access to the cache memory 2300 is missed. The address corresponding to data that is requested from the main memory 2200 because the data intended to be acquired by the host processor 2100 is not stored in the cache memory 2300, may be the trigger address.

The page analyzer 2110 may compare the numbers of the pages respectively corresponding to sequentially input trigger addresses. In an embodiment, the page analyzer 2110 may update metadata related to a space-locality when the numbers of the pages respectively corresponding to a first trigger address and a second trigger address, which are sequentially input, are equal to each other. In an embodiment, the page analyzer 2110 may update metadata related to a time-locality when the numbers of the pages respectively corresponding to the first trigger address and the second trigger address, which are sequentially input, are different from each other. In another embodiment, the page analyzer 2110 may update the metadata related to a space-locality and the metadata related to a time-locality when the numbers of the pages respectively corresponding to the first trigger address and the second trigger address, which are sequentially input, are different from each other.

The prefetch information storage 2120 may store metadata that is used to perform a prefetch operation. The prefetch operation may be an operation of providing data predicted to be requested by the host processor 2100, among pieces of data stored in the main memory 2200, to the cache memory 2300.

The prefetch information storage 2120 may include a space-locality metadata storage 2121 and a time-locality metadata storage 2122. The space-locality metadata storage 2121 may store metadata related to a space-locality. The metadata related to a space-locality may include page history information and information about a prefetch address. The time-locality metadata storage 2122 may store metadata related to a time-locality. The metadata related to a time-locality may include information about associated addresses and information about associated pages.

The space-locality prefetcher 2130 may prefetch data determined based on the metadata related to a space-locality, among pieces of data stored in the main memory 2200. The space-locality prefetcher 2130 may prefetch the data corresponding to a prefetch address determined based on the variation pattern of the page corresponding to the second trigger address. The space-locality prefetcher 2130 may prefetch the data corresponding to the prefetch address, among pieces of data stored in the main memory 2200, to the cache memory 2300.

The time-locality prefetcher 2140 may prefetch data determined based on the metadata related to a time-locality, among pieces of data stored in the main memory 2200. The time-locality prefetcher 2140 may prefetch the data corresponding to a third trigger address associated with the second trigger address, among pieces of data stored in the main memory 2200, to the cache memory 2300.

Figure 10:
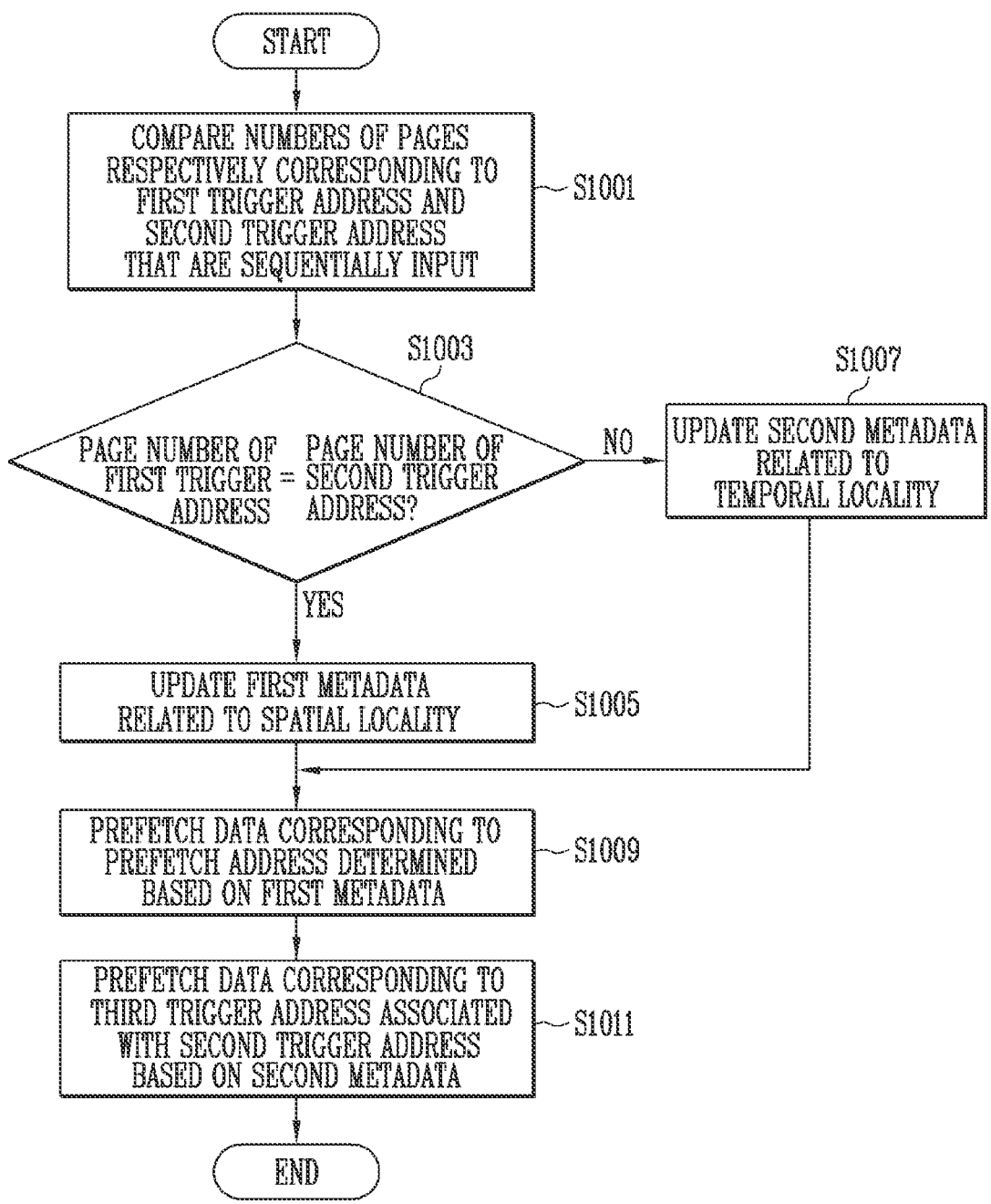
FIG. 10 is a flowchart for describing a prefetch operation according to an embodiment of the present disclosure.

FIG. 10 is a flowchart for describing a prefetch operation according to an embodiment of the present disclosure.

Referring to FIG. 10, at operation S1001, a computing system 50 may compare the numbers of the pages respectively corresponding to a first trigger address and a second trigger address that are sequentially input. In an embodiment, a trigger address may be an address corresponding to data for which access to a first memory module is missed. In an embodiment, the trigger address may be an address corresponding to data for which access to a cache memory is missed.

At operation S1003, the computing system 50 may compare whether the page number of the first trigger address is equal to the page number of the second trigger address. When the page number of the first trigger address is equal to the page number of the second trigger address, operation S1005 may be performed. Conversely, when the page number of the first trigger address is different from the page number of the second trigger address, operation S1007 may be performed.

At operation S1005, the computing system 50 may update first metadata related to a space-locality when the page number of the first trigger address is equal to the page number of the second trigger address. In an embodiment, the computing system 50 may update information about the variation between offset values for the page corresponding to the first to second trigger addresses and update a predicted variation corresponding to the variation pattern.

At operation S1007, the computing system 50 may update second metadata related to a time-locality when the page number of the first trigger address is different from the page number of the second trigger address. In an embodiment, the computing system 50 may update the second metadata to set the second trigger address as an address associated with the first trigger address. In another embodiment, the computing system 50 may update the second metadata to set the page corresponding to the first trigger address as a page associated with the page corresponding to the second trigger address.

At operation S1009, the computing system 50 may prefetch the data corresponding to a prefetch address determined based on the first metadata. In an embodiment, a space-locality prefetcher may prefetch the data corresponding to the prefetch address determined based on the variation pattern.

At operation S1011, the computing system 50 may prefetch the data corresponding to a third trigger address associated with the second trigger address based on the second metadata.

According to an embodiment of the present disclosure, metadata related to a space-locality or metadata related to a time-locality may be selectively updated based on a result of comparing the respective page numbers of sequentially input trigger addresses. According to an embodiment of the present disclosure, because data is prefetched based on the selectively updated metadata, the accuracy of prediction of data to be requested by a host may be improved.

Figure 11:
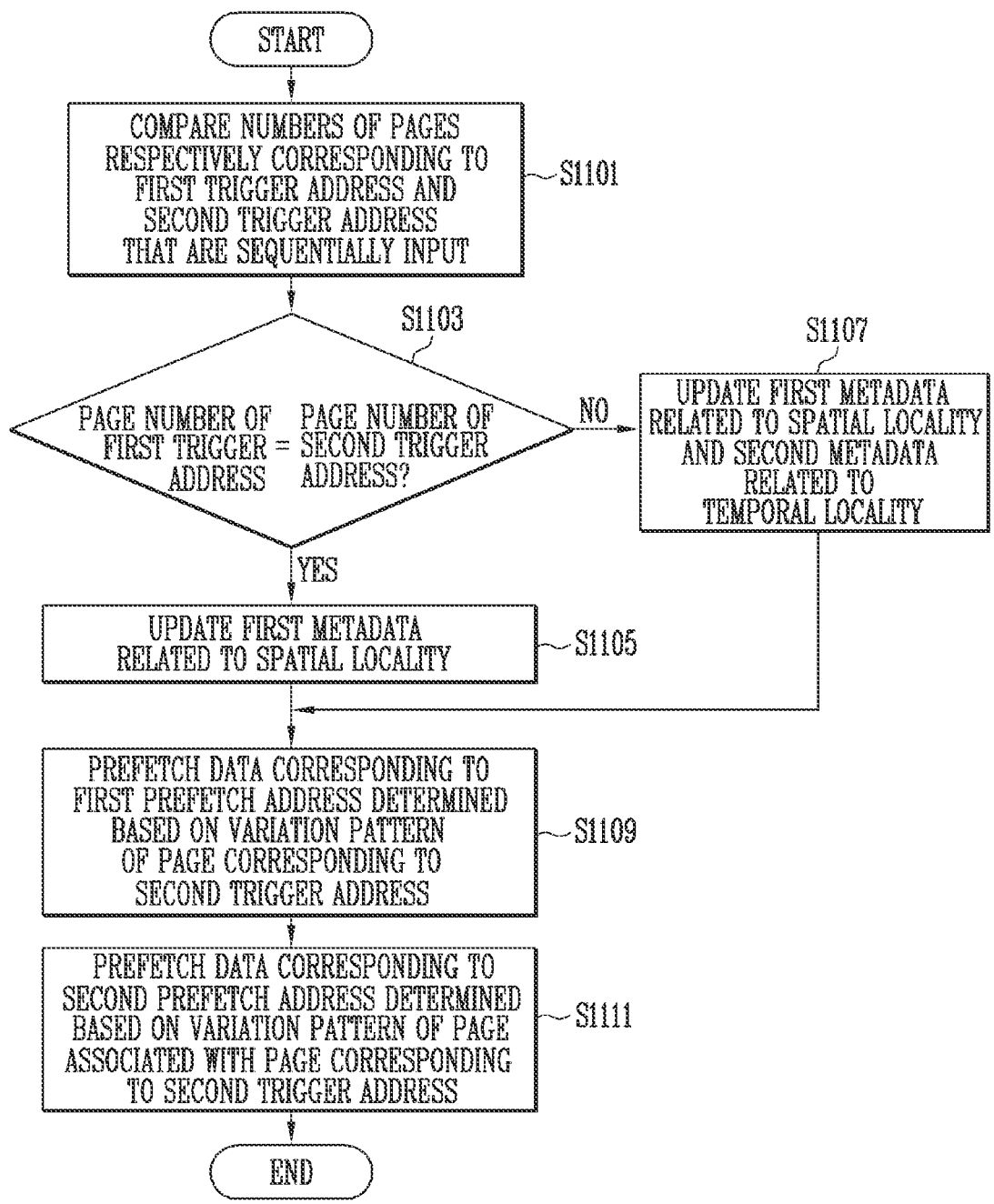
FIG. 11 is a flowchart for describing a prefetch operation according to another embodiment of the present disclosure.

FIG. 11 is a flowchart for describing a prefetch operation according to another embodiment of the present disclosure.

Referring to FIG. 11, at operation S1101, a computing system 50 may compare the numbers of the pages respectively corresponding to a first trigger address and a second trigger address that are sequentially input.

At operation S1103, the computing system 50 may compare whether the page number of the first trigger address is equal to the page number of the second trigger address. When the page number of the first trigger address is equal to the page number of the second trigger address, operation S1105 may be performed. Conversely, when the page number of the first trigger address is different from the page number of the second trigger address, operation S1107 may be performed.

At operation S1105, the computing system 50 may update first metadata related to a space-locality when the page number of the first trigger address is equal to the page number of the second trigger address.

At operation S1107, the computing system 50 may update the first metadata related to a space-locality and second metadata related to a time-locality when the page number of the first trigger address is different from the page number of the second trigger address.

At operation S1109, the computing system 50 may prefetch the data corresponding to a first prefetch address determined based on the variation pattern of the page corresponding to the second trigger address. At operation S1111, the computing system 50 may prefetch the data corresponding to a second prefetch address determined based on the variation pattern of a page associated with the page corresponding to the second trigger address.

Figure 12:
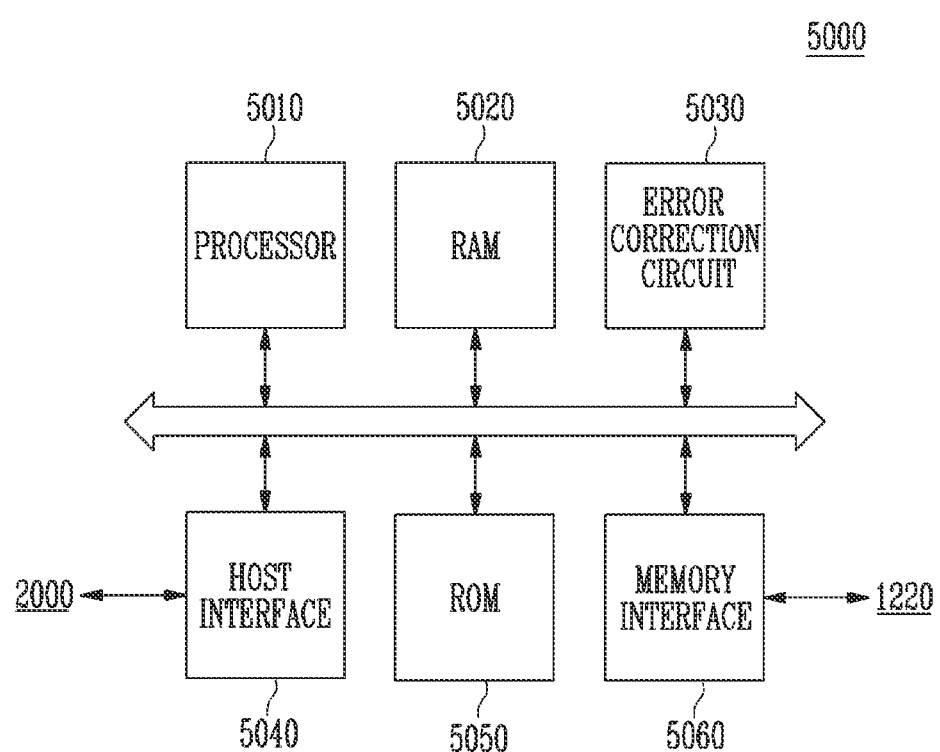
FIG. 12 is a diagram illustrating a memory controller according to an embodiment of the present disclosure.

FIG. 12 is a diagram illustrating a memory controller 5000 according to an embodiment of the present disclosure.

The memory controller 5000 of FIG. 12 may indicate the memory controller 1210 of FIG. 1.

Referring to FIG. 12, the memory controller 5000 may include a processor 5010, a RAM 5020, an error correction circuit 5030, a host interface 5040, a ROM 5050, and a memory interface 5060.

The processor 5010 may control the overall operation of the memory controller 5000. The processor 5010 may control the operation of the memory controller 5000 to store the data requested by a host 2000 in a memory device 1220.

In an embodiment, the processor 5010 may update at least one of metadata related to a space-locality and metadata related to a time-locality based on a result of comparing the respective page numbers of trigger addresses sequentially input from the host 2000. In an embodiment, the processor 5010 may control the memory controller 5000 to prefetch data determined based on the metadata related to a space-locality and the metadata related to a time-locality to a first memory module 1100. In an embodiment, the processor 5010 may include the page analyzer 1211, the space-locality prefetcher 1216, and the time-locality prefetcher 1217 illustrated in FIG. 2.

The RAM 5020 may be used as the buffer memory, the cache memory, the operation memory, and the like of the memory controller 5000. In an embodiment, the RAM 5020 may include the prefetch information storage 1213 illustrated in FIG. 2. In an embodiment, the RAM 5020 may store metadata related to a space-locality and metadata related to a time-locality.

The error correction circuit 5030 may perform error correction. The error correction circuit 5030 may perform ECC encoding based on the data to be written to the memory device 1220 through the memory interface 5060. The ECC-encoded data may be delivered to the memory device 1220 through the memory interface 5060. The error correction circuit 5030 may perform ECC decoding on the data that is received from the memory device 1220 through the memory interface 5060. For example, the error correction circuit 5030 may be included in the memory interface 5060 as a component of the memory interface 5060.

The ROM 5050 may store various types of information, which is required for operation of the memory controller 5000, in the form of firmware.

The memory controller 5000 may communicate with an external device (e.g., the host 2000, an application processor, or the like) through the host interface 5040. The memory controller 5000 may be provided with data through the host interface 5040. In an embodiment, the host interface 5040 may sequentially receive trigger addresses from the host 2000.

The memory controller 5000 may communicate with the memory device 1220 through the memory interface 5060. The memory controller 5000 may transmit a command, an address, a control signal, and the like to the memory device 1220 through the memory interface 5060 and receive data therefrom. For example, the memory interface 5060 may include a NAND interface.

According to the present disclosure, a memory device and a host device that are capable of improving the accuracy of data prefetch based on the access pattern of the host are provided.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory system comprising:
 a first memory module configured to communicate with a host through a first interface; and
 a second memory module configured to communicate with the host through a second interface,
 wherein the second memory module comprises:
  a memory device including a plurality of pages configured to store data; and
  a memory controller configured to:
   update at least one of first metadata related to a space-locality and second metadata related to a time-locality based on a result of comparing numbers of pages respectively corresponding to a first trigger address and a second trigger address sequentially input from the host, and
   prefetch, to the first memory module, the data determined based on the first metadata and the second metadata, and
 wherein the first trigger address and the second trigger address are addresses corresponding to data for which access to the first memory module is missed.

2. The memory system according to claim 1, wherein the second memory module has a lower priority than the first memory module when accessed by the host.

3. The memory system according to claim 2, wherein the memory controller comprises a prefetch information storage configured to store the first metadata and the second metadata.

4. The memory system according to claim 3, wherein the memory controller further comprises a page analyzer configured to update the first metadata when the numbers of the pages respectively corresponding to the first trigger address and the second trigger address are equal to each other.

5. The memory system according to claim 4, wherein the first metadata includes page history information, which is information about a variation between offset values for trigger addresses corresponding to each of the plurality of pages, and information about a prefetch address determined based on a pattern of the variation for each of the plurality of pages.

6. The memory system according to claim 5, wherein the second metadata includes information about mapping of trigger addresses sequentially input from the host to associated addresses or information about mapping of pages respectively corresponding to the trigger addresses sequentially input from the host to associated pages.

7. The memory system according to claim 6, wherein the memory controller further comprises:
 a space-locality prefetcher configured to prefetch, to the first memory module, the data corresponding to a first prefetch address determined based on the pattern of the variation for a page corresponding to the second trigger address.

8. The memory system according to claim 7, wherein the memory controller further comprises a time-locality prefetcher configured to prefetch, to the first memory module, the data corresponding to a third trigger address associated with the second trigger address based on the second metadata.

9. The memory system according to claim 8, wherein the page analyzer is further configured to update the second metadata when the numbers of the pages respectively corresponding to the first trigger address and the second trigger address are different from each other.

10. The memory system according to claim 8, wherein the page analyzer is further configured to update the first metadata and the second metadata when the numbers of the pages respectively corresponding to the first trigger address and the second trigger address are different from each other.

11. The memory system according to claim 6, wherein the memory controller further comprises a space-locality prefetcher configured to prefetch, to the first memory module, the data corresponding to a first prefetch address determined based on the pattern of the variation for a page corresponding to the second trigger address and the data corresponding to a second prefetch address determined based on the pattern of the variation for a page associated with the page corresponding to the second trigger address.

12. The memory system according to claim 1, wherein:
the first interface includes a dual inline memory module (DIMM) interface, and
the second interface includes a compute express link (CXL) interface.

13. A host device comprising:
a main memory including a plurality of pages;
a cache memory configured to cache a part of data stored in the main memory; and
a processor configured to:
 access the main memory and the cache memory,
 update at least one of first metadata related to a space-locality and second metadata related to a time-locality based on a result of comparing numbers of pages respectively corresponding to a first trigger address and a second trigger address, and
  prefetch data from the main memory to the cache memory based on the first metadata and the second metadata,
  wherein the first and second trigger addresses correspond to data for which access to the cache memory is missed.

14. The host device according to claim 13, wherein the first metadata includes page history information, which is information about a variation between offset values for trigger addresses corresponding to each of the plurality of pages, and information about a prefetch address determined based on a pattern of the variation for each of the plurality of pages.

15. The host device according to claim 14, wherein the processor comprises a page analyzer configured to:
update the first metadata when the numbers of the pages respectively corresponding to the first trigger address and the second trigger address are equal to each other, and
update the second metadata when the numbers of the pages respectively corresponding to the first trigger address and the second trigger address are different from each other.

16. The host device according to claim 15, wherein the second metadata includes information about mapping of the second trigger address to an address associated with the first trigger address.

17. The host device according to claim 16, wherein the processor further comprises a space-locality prefetcher configured to prefetch, to the cache memory, the data corresponding to a first prefetch address determined based on the pattern of the variation for a page corresponding to the second trigger address.

18. The host device according to claim 17, wherein the processor further comprises a time-locality prefetcher configured to prefetch, to the cache memory, the data corresponding to a third trigger address associated with the second trigger address based on the second metadata.

19. The host device according to claim 13, wherein the processor comprises a page analyzer configured to:
update the first metadata when the numbers of the pages respectively corresponding to the first trigger address and the second trigger address are equal to each other, and
update the first metadata and the second metadata when the numbers of the pages respectively corresponding to the first trigger address and the second trigger address are different from each other.

20. The host device according to claim 19, wherein the processor further comprises a space-locality prefetcher configured to prefetch, to the cache memory, the data corresponding to a first prefetch address determined based on the pattern of the variation for a page corresponding to the second trigger address and the data corresponding to a second prefetch address determined based on the pattern of the variation for a page associated with the page corresponding to the second trigger address.

* * * * *